(12) United States Patent
Kojima

(10) Patent No.: US 8,320,440 B2
(45) Date of Patent: Nov. 27, 2012

(54) EQUALIZER CIRCUIT

(75) Inventor: Shoji Kojima, Tokyo (JP)

(73) Assignee: Advantest Corporation, Tokyo (JP)

(*) Notice: Subject to any disclaimer, the term of this patent is extended or adjusted under 35 U.S.C. 154(b) by 263 days.

(21) Appl. No.: 12/808,359

(22) PCT Filed: Mar. 4, 2009

(86) PCT No.: PCT/JP2009/000988
§ 371 (c)(1),
(2), (4) Date: Jun. 15, 2010

(87) PCT Pub. No.: WO2010/100674
PCT Pub. Date: Sep. 10, 2010

(65) Prior Publication Data
US 2011/0051798 A1    Mar. 3, 2011

(51) Int. Cl.
*H03K 5/159* (2006.01)
(52) U.S. Cl. ........ 375/232; 375/224; 375/229; 375/230; 375/233; 375/234; 375/296; 455/63.1; 455/67.13; 455/69; 455/114.3; 455/522; 330/149; 708/300; 333/18; 333/28 R
(58) Field of Classification Search .................. 375/224, 375/229, 230, 232, 233, 234, 296; 455/63.1, 455/67.13, 69, 114.3, 522; 330/149; 708/300; 333/18, 28 R
See application file for complete search history.

(56) References Cited

U.S. PATENT DOCUMENTS
2008/0059091 A1* 3/2008 Watanabe et al. ............... 702/66

FOREIGN PATENT DOCUMENTS
| JP | 2004-518326 A | 6/2004 |
| JP | 2008-271552 A | 11/2008 |
| WO | 2005/121827 A1 | 12/2005 |

OTHER PUBLICATIONS

International Search Report (IPRP) dated Sep. 6, 2011 for the related PCT Application No. PCT/JP2009/000988.
PCT International Search Report for PCT Application No. PCT/JP2009/000988 mailed on Jun. 9, 2009.
PCT Written Opinion for PCT Application No. PCT/JP2009/000988 mailed on Jun. 9, 2009.

* cited by examiner

*Primary Examiner* — Leon Flores
(74) *Attorney, Agent, or Firm* — Ladas & Parry, LLP

(57) ABSTRACT

An equalizer circuit receives digital amplitude data A[N] which represents the amplitude level of the N-th (N is a nonnegative integer) signal to be transmitted via a transmission line and timing data T[N] which represents the cycle of the signal, and performs waveform shaping. The equalizer circuit includes: M (M is an integer) calculation units $ECU_1$ through $ECU_m$; and an adder ADD1 which adds the output data of the M calculation units $ECU_1$ through $ECU_M$ and the amplitude data A[N] together so as to generate equalized amplitude data D[N]. A step response waveform $R_{STEP}(t)$ for the transmission line is approximated by Expression $R_{STEP}(t)=S_{STEP}(t)\cdot(1-S_{j=1:M}f_j(t))$ using M (M is an integer of 2 or more) functions $f_j(t)$ ($1 \leq j \leq M$) and a step waveform $S_{STEP}(t)$ with the time t as an argument. The representative value of the function $f_j(t)$ in a range between T1 and T2 is represented by a function $g_j(T1, T2)$. The calculation unit $ECU_j$ calculates output data $D_j[N]$ represented by Expression $D_j[N]=\Sigma_{n=0:N}[(A[n]-A[n-1])\cdot g_j(t_N-t_n, t_{N+1}-t_n)]$.

17 Claims, 14 Drawing Sheets

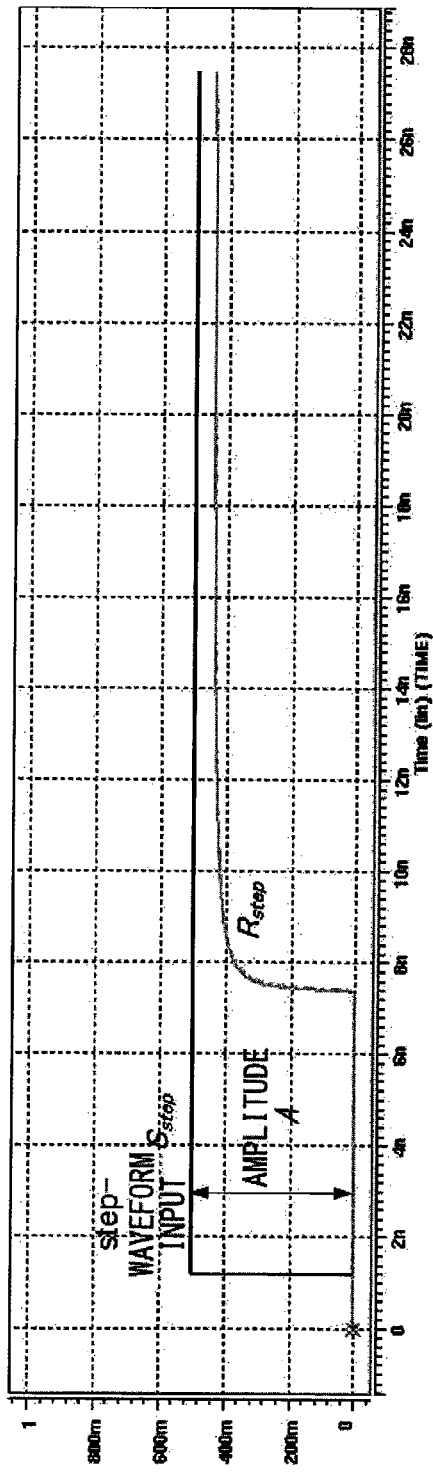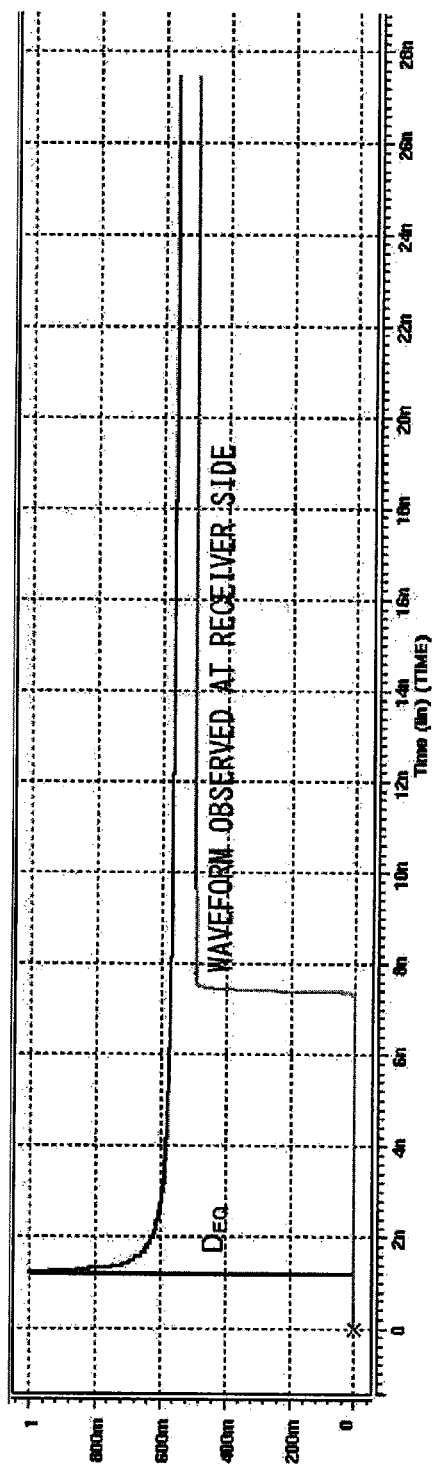

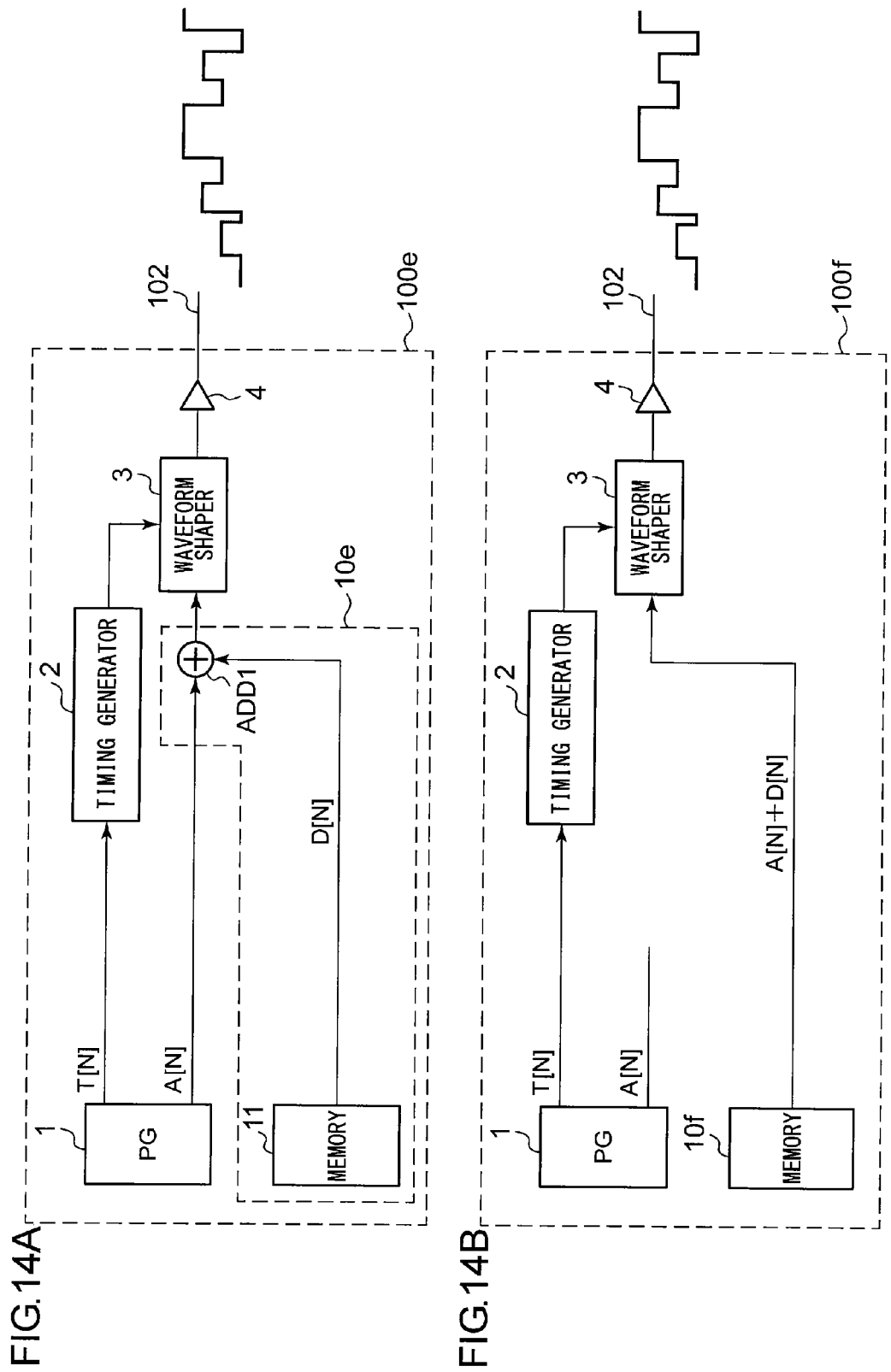

EQUALIZER CIRCUIT

This application is the U.S. National Stage of International Patent Application No. PCT/JP2009/000988 filed on Mar. 4, 2009, and claims priority thereto, the disclosure of which is hereby incorporated by reference in its entirety.

BACKGROUND OF THE INVENTION

1. Field of the Invention

The present invention relates to an equalizer circuit.

2. Description of the Related Art

When a single-ended signal or a differential signal is transmitted from a transmission device (transmitter) to a reception device (receiver) via a transmission line, waveform distortion occurs due to loss (transmission loss) that occurs in the transmission line. The transmission loss markedly increases as the length (transmission length) of the transmission line becomes longer. In general, such a long transmission line has approximately the effect of low-pass filter on the signal. Accordingly, when a rectangular wave signal is transmitted from a transmitter, a distorted waveform is observed at the reception terminal of the receiver.

In order to solve such a problem, in some cases, an equalizer circuit is provided so as to correct the transmitted waveform by canceling out the waveform distortion that occurs due to transmission loss (which will also be referred to as "pre-emphasis" or "pre-distortion"). As an example of pre-emphasis, processing is performed in which the high frequency component of the original signal to be transmitted is extracted so as to generate an emphasis component, and the emphasis component thus extracted is superimposed on the original signal, or the like.

In a case in which one cycle of the transmission signal (which will also be referred to as a "unit interval UI" hereafter) is shorter than the time constant of the waveform distortion, a discrete-time equalizer is effectively employed, which is configured to add the emphasis components in increments of UIs. In a case in which a binary transmission signal is equalized, and in a case in which a bit stream is transmitted with a constant UI, such an equalizer can be implemented in the form of a simple circuit.

[Patent Document 1]
International Publication WO 05/121827 pamphlet

An automatic test apparatus (Automatic Test Equipment) configured to test a semiconductor device includes a unit which is a so-called timing controller. Such a timing controller provides a function of changing, as desired, the timing of each edge of a signal to be applied to a device under test (DUT), i.e., the UI, in increments of bits in a real time manner. This function is referred to as "RTTC (Real Time Timing Control)" or "on the fly operation". As a function similar to RTTC, in some cases, the ATE has a jitter injection function as disclosed in Patent Document 1, for example. The jitter injection function is a function in which, in order to evaluate the jitter tolerance of the DUT, a signal containing a known jitter is supplied from the ATE to the DUT, and the ATE judges whether or not the DUT can receive the signal correctly. Based upon thinking similar to RTTC, the jitter injection can be performed by dynamically changing a delay applied to each edge of a signal.

With such an ATE having an RTTC function, the UI is dynamically changed in a real time manner. Accordingly, conventional discrete-time equalizers, which are designed under the assumption that the UI is maintained at a constant value, cannot be employed.

SUMMARY OF THE INVENTION

The present invention has been made in view of such a situation. Accordingly, it is an exemplary purpose of the present invention to provide an equalizer which is capable of supporting a UI that changes in a real time manner.

An embodiment of the present invention relates to an equalizer circuit configured to receive amplitude data A[N] which represents the amplitude level of an N-th (N is a non-negative integer) signal to be transmitted via a transmission line and timing data T[N] which represents the cycle of the signal, and to perform waveform shaping. The equalizer circuit comprises: M (M is an integer) calculation units; and a first adder configured to add output data $D_1[N]$ through $D_M[N]$ output from the M calculation units and the amplitude data A[N] so as to generate equalized amplitude data D[N]. With such an arrangement, a step response waveform $R_{STEP}(t)$ for the transmission line is approximated by Expression $R_{STEP}(t)=S_{STEP}(t) \cdot (1-\Sigma_{j=1:M} f_j(t))$ using M functions $f_j(t)$ ($1 \leq j \leq M$) and a step waveform STEP $S_{STEP}(t)$ with time t as an argument. Furthermore, a representative value of the function $f_j(t)$ in a range between T1 and T2 is represented by a function $g_j(T1, T2)$. Moreover, the j-th ($1 \leq j \leq M$) calculation unit calculates output data $D_j[N]$ represented by Expression $D_j[N]=\Sigma_{n=0:N}[(A[n]-A[n-1]) \cdot g_j(t_N-t_n, t_{N+1}-t_n)]$.

Such an embodiment provides suitable equalizing according to changes in the unit interval T[N] even if the unit interval T[N] changes in increments of cycles.

Another embodiment of the present invention relates to a transmitter.

The transmitter comprises: a pattern generator configured to generate amplitude data A[N] and timing data T[N]; the above-described equalizer circuit; a waveform shaping unit configured to perform retiming of the amplitude data D[N] equalized by the equalizer circuit, according to the timing data T[N]; and a driver configured to convert the output data of the waveform shaping unit into a multi-valued signal.

Such an embodiment provides suitable equalizing of distortion of a waveform transmitted via a transmission line even if the distortion has a greater time constant than that of the transmission data UI. Thus, such an arrangement has the advantage that the receiver side does not require a complex reception equalizer such as a decision feedback equalizer or the like.

Yet another embodiment of the present invention relates to a test apparatus configured to supply test data to a device under test. The test apparatus comprises: a pattern generator configured to generate amplitude data A[N] and timing data T[N]; a timing generator configured to receive the timing data T[N], and to generate an edge according to a timing that corresponds to the value of the timing data T[N]; the above-described equalizer circuit; a waveform shaping unit configured to perform retiming of the amplitude data D[N] equalized by the equalizer circuit, according to the edge generated by the timing generator; and a driver configured to convert the output data of the waveform shaping unit into a multi-valued signal.

Such an embodiment provides suitable equalizing even if the signal has a unit interval UI that changes over time. Thus, such an arrangement is capable of providing an equalizing function that is compatible with an RTTC function or a jitter injection function. Alternatively, such an arrangement is capable of testing the performance of a DUT while changing the amount of equalizing as desired.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A and 3B are simulation waveform diagrams which show the output waveform when a signal having an ideal step waveform is transmitted via a transmission line, and a waveform to be output from the equalizer, respectively;

FIGS. 14A and 14B are block diagrams which show the configurations of equalizer circuits according to a sixth modification and a seventh modification, respectively.

DETAILED DESCRIPTION OF THE INVENTION

Figure 1:
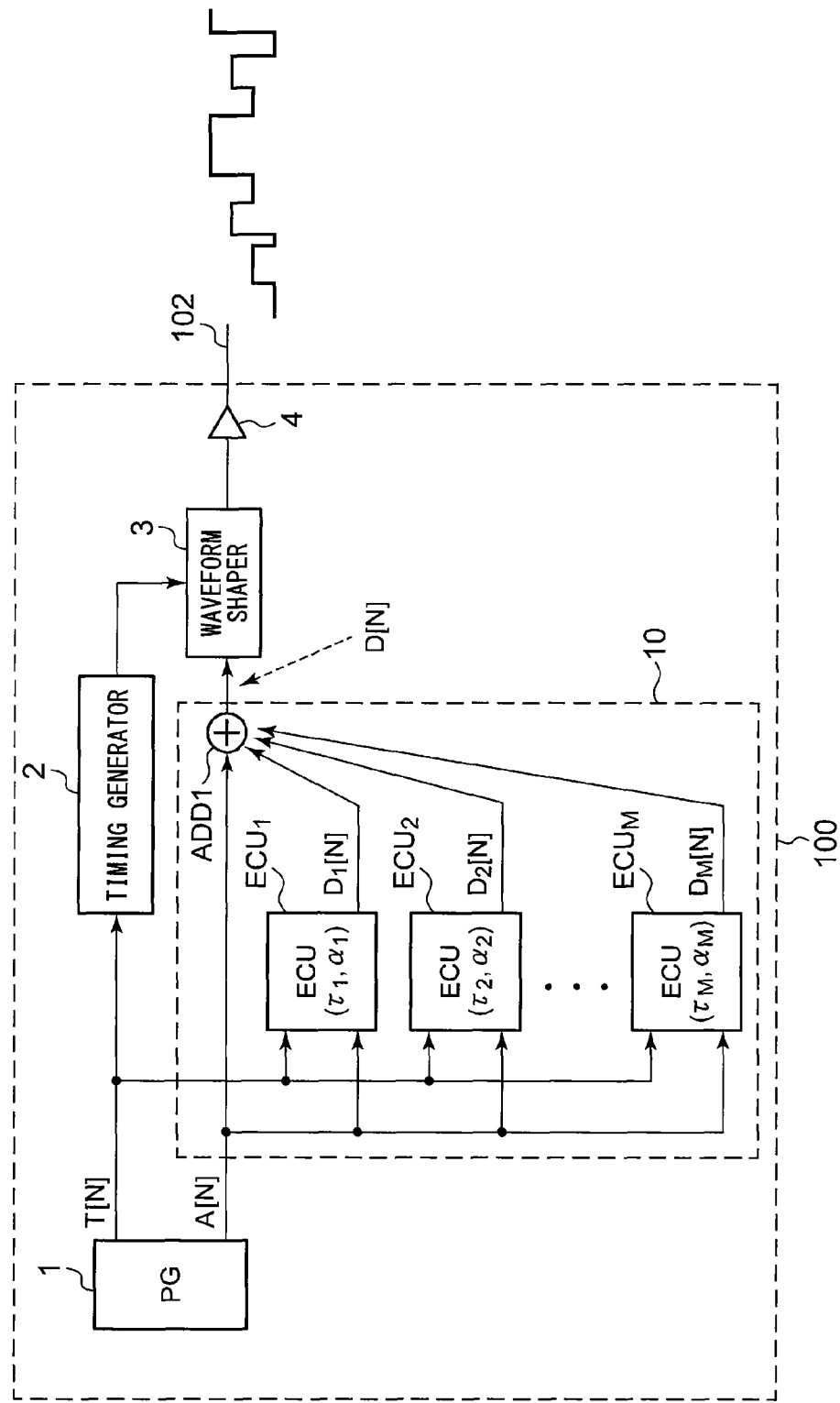
FIG. 1 is a block diagram which shows a configuration of an equalizing circuit according to an embodiment.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B. In the same way, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

FIG. 1 is a block diagram which shows a configuration of an equalizer 10 according to an embodiment. FIG. 1 shows an arrangement in which the equalizer 10 is included as a built-in component in an ATE or an interface circuit 100 for an ordinary semiconductor device.

First, description will be made regarding the overall configuration of the interface circuit 100. The interface circuit 100 is connected to an unshown receiver circuit, and transmits data via a transmission line 102. The data may be transmitted in the form of binary data. Also, the data may be transmitted in the form of a multi-valued signal such as a four-valued signal or an eight-valued signal.

A pattern generator (PG) 1 generates amplitude data A[N] which represents the amplitude of a signal to be transmitted, and timing data T[N] which represents the cycle. N is sequentially incremented beginning with 0. That is to say, the amplitude of the data is generated in the order A[0], A[1], A[2], . . . , from the beginning of the data, and the cycle of the data is generated in the order T[0], T[1], T[2], . . . , from the beginning of the data.

The equalizer circuit 10 receives the amplitude data A[N] and the timing data T[N] for each cycle N, and performs waveform shaping of the waveform, i.e., corrects the amplitude data A[N], such that the waveform distortion due to transmission loss that occurs in the transmission line 102 is canceled out at the reception terminal, thereby generating equalized amplitude data D[N].

A timing generator 2 receives the timing data T[N] for each cycle N, and generates an edge at a timing that corresponds to the value of the timing data T[N]. A waveform shaper 3 performs retiming of the equalized amplitude data D[N] using each edge generated by the timing generator 2. A driver 4 performs digital/analog conversion of the output data of the waveform shaper, thereby outputting a multi-valued signal. There are various known techniques for providing signal processing performed by the timing generator 2, the waveform shaper 3, and the driver 4, which can be employed in the present embodiment.

Description will be made regarding a configuration of the equalizer 10.

The equalizer circuit 10 includes M (M is an integer) calculation units $ECU_1$ through $ECU_M$(Equalizing Calculation Units) and a first adder ADD1.

The electrical properties (electrical length, transmission loss, impedance, etc.) of the transmission line 102 are measured or calculated beforehand by measurement or by simulation. Description will be made on the assumption that the step response waveform $R_{STEP}(t)$ is known.

With such an arrangement, the step response waveform $R_{STEP}(t)$ is approximated by the Expression $R_{STEP}(t)=S_{STEP}(t)\cdot(1-\Sigma_{j=1:M}f_j(t))$ using M functions $f_j(t)$ ($1\leq j\leq M$) and a step waveform $S_{STEP}(t)$.

For the N-th signal, the j-th ($1\leq j\leq M$) calculation unit $ECU_j$ calculates the output data $D_j[N]$ represented by the Expression $D_j[N]=\Sigma_{n=0:N}[(A[n]-A[n-1])\cdot g_j(t_N-t_n, t_{N+1}-t_n)]$. Here, the function $g_j(T1, T2)$ represents a representative value of the function $f_j(t)$ in a range between T1 and T2.

The first adder ADD1 adds the original amplitude data A[n] and the output data $D_1[N]$ through $D_M[N]$ of the M calculation units $ECU_1$ through $ECU_M$, thereby generating equalized amplitude data D[N].

$$D[N]=A[N]+\Sigma_{j=1:M}(D_j[N])$$

Figure 2:
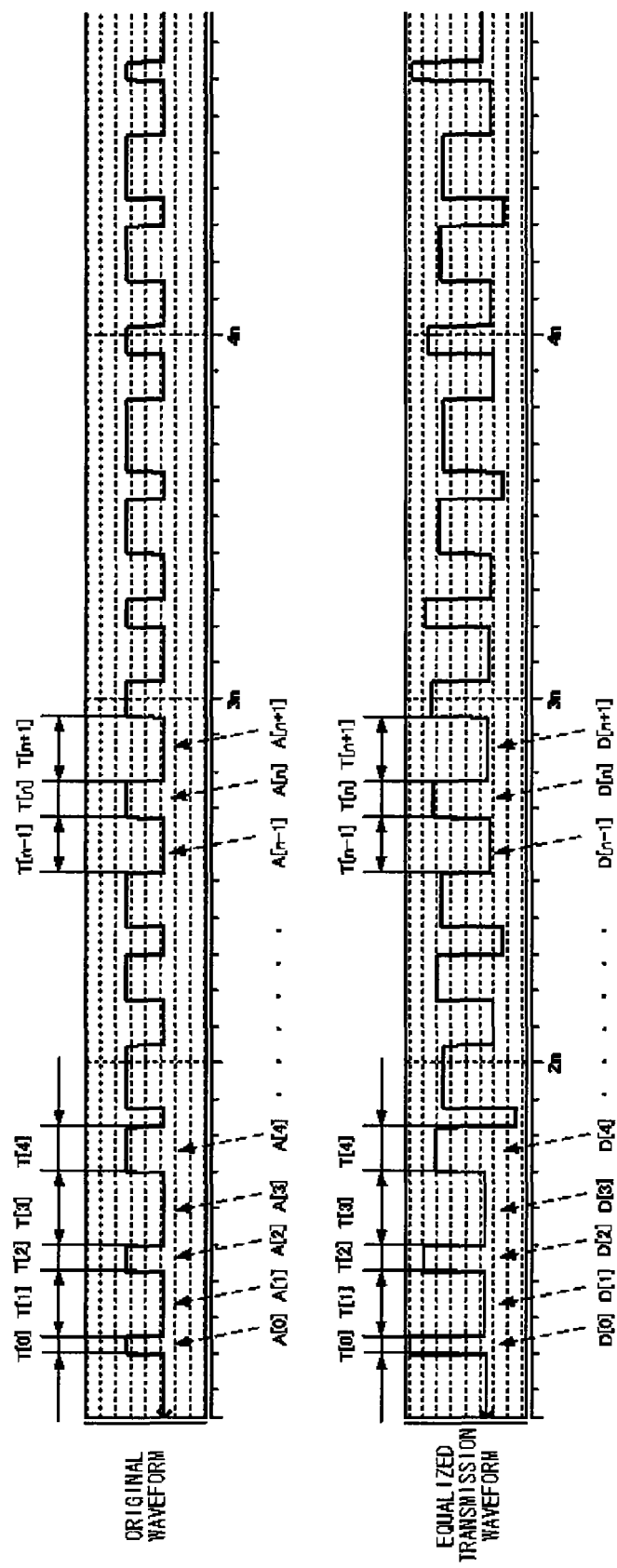
FIG. 2 is an example of a time chart which shows the operation of the equalizer shown in FIG. 1.

The above is the configuration of the equalizer circuit 10. FIG. 2 is an example of a time chart which shows the operation of the equalizer 10 shown in FIG. 1. The upper graph represents the original waveform that corresponds to A[N] and T[N]. The lower graph represents the equalized signal waveform that corresponds to D[N] and T[N]. When the equalized signal is transmitted via the transmission line 102, a waveform close to the original waveform represented by the upper graph is observed at the reception terminal.

Such an embodiment is capable of suitably canceling out distortion of the waveform even if the cycle T[N] changes in increments of cycle N.

With an arrangement in which the equalizer circuit 10 is employed in the ATE, the ATE has an equalizing function that is compatible with the RTTC function and the jitter injection function.

Also, with an arrangement in which the equalizer circuit 10 is employed in a transmitter circuit of a semiconductor device, such an equalizing function is implemented for a transmission method in which the data rate is dynamically changed, or a transmission method in which the signal is modulated (so as to carry data) in both the amplitude direction and the time direction.

Specific description will be made below regarding implementation of the equalizer circuit 10.

[Equalizer Principles] First, description will be made beginning with a continuous time equalizer. The step waveform $S_{STEP}(t)$ is a waveform having amplitude A, which is represented by Expression (1).

$$S_{step}(t)=A \cdot U(t) \tag{1}$$

Here, the function U(t) is a unit step function. When t<0, U(t) is zero, and when 0≦t, U(t) is 1.

FIGS. 3A and 3B show simulation waveform curves which represent the output waveform $R_{STEP}(t)$ that is observed when an ideal step waveform $S_{STEP}(t)$ is transmitted via a given transmission line, and the waveform $D_{EQ}(t)$ which is to be output from the equalizer circuit. The electrical properties of the transmission line are fitted to those of a transmission line having a length of 1 m formed on an actual printed board. The waveform $R_{STEP}(t)$ is nothing but the step response.

As a first step, the waveform $R_{STEP}(t)$ is approximately expanded using M functions, i.e., $f_1(t)$ $f_2(t), \ldots, f_M(t)$. M is an integer.

$$R_{STEP}(t)=S_{STEP}(t) \cdot (1-\Sigma_{j=1:M} f_j(t)) \tag{A}$$

The symbol "$\Sigma_{j=1:M}(\ )$" represents a function of adding the elements within the parentheses in increments of index j beginning with 1 until M.

Although the functions $f_1(t), f_2(t), \ldots, f_M(t)$ can be defined in completely different forms, these functions are preferably defined in the same form. This is because such an arrangement provides a simple implementation by means of hardware.

The waveform $D_{EQ}(t)$ can be obtained by adding the original waveform $S_{STEP}(t)$ and a waveform obtained by inverting the waveform $R_{STEP}(t)$. Accordingly, the waveform $D_{EQ}(t)$ is represented by the Expression $$D_{EQ}(t)=S_{STEP}(t)\cdot[1+\Sigma_{j=1:M}f_j(t)] \tag{B}$$

When a signal is transmitted through an ordinary transmission line, the waveform $R_{STEP}(t)$ is approximated by Expression (2), for example.

$$R_{step}(t) = S_{step}(t) \cdot \left[1 - \sum_{j=1}^{M} \left\{\alpha_j \cdot \exp\left(\frac{-t}{\tau_j}\right)\right\}\right] \tag{2}$$

That is to say, the J-th function $f_j(t)$ is defined by the following Expression, using parameters $\alpha_j$ and $\tau_j$.

$$f_j(t)=\alpha_j \cdot \exp(-t/\tau_j) \tag{C}$$

For example, a transmission line having a step response as shown in FIG. 3A can be sufficiently approximated using M=4 functions. In this case, the following fitting parameters are employed, for example.

$\alpha_1$=0.90, $\tau_1$=65 ps
$\alpha_2$=0.26, $\tau_2$=400 ps
$\alpha_3$=0.10, $\tau_3$=2000 ps
$\alpha_4$=0.14, $\tau_4$=100000 ps Although the integer M should be determined giving consideration to the tradeoff between the circuit area and the fitting precision (equalizing precision), considering a realistic implementation, the integer is preferably determined in a range between 1 and 5.

In this case, the waveform $D_{EQ}(t)$ shown in FIG. 3B is approximated by the following Expression 3.

$$D_{EQ}(t) = S_{step}(t) \cdot \left[1 + \sum_{j=1}^{M} \left\{\alpha_j \cdot \exp\left(\frac{-t}{\tau_j}\right)\right\}\right] \tag{3}$$

In the second step, the equalizing processing for the step waveform described in the first step is expanded for a continuous data stream. In general, the transmission line functions as a passive device, which does not behave in a non-linear manner. Accordingly, it can be assumed that the superposition principle for a linear circuit holds true.

Accordingly, the original waveform S(t) is resolved into the sum of the step waveforms using the following Expression 4.

$$S(t)=SA_n(t)+SA_{n-1}(t)+SA_{n-2}(t)+\ldots+SA_0(t) \tag{4}$$

It should be noted that $SA_n(t)=(A[n]-A[n-1])\cdot U(t-t_n) \ldots$ (4a)

Figure 4:
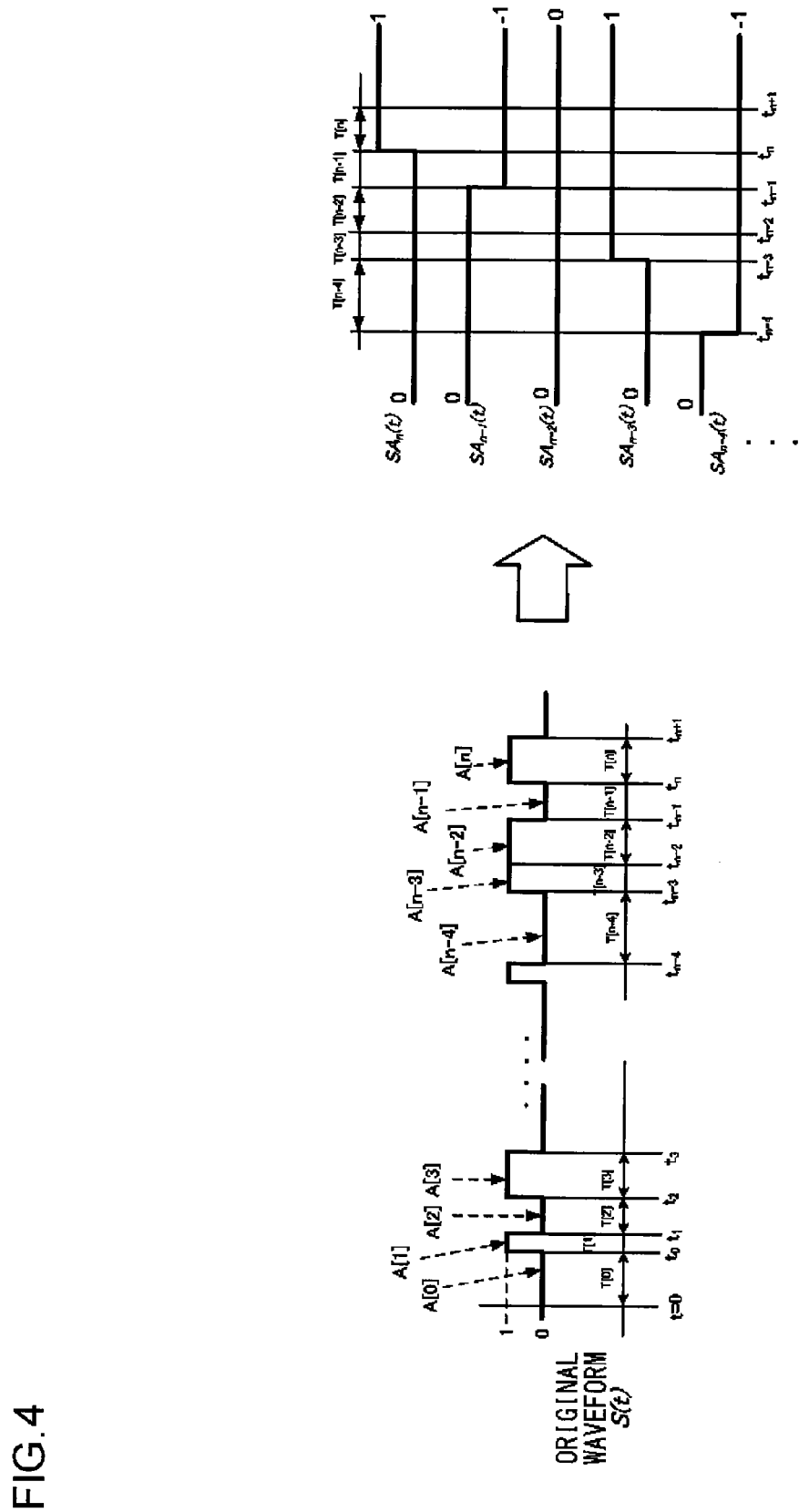
FIG. 4 is a diagram which shows resolving of a continuous data stream into the sum of step waveforms.

FIG. 4 is a diagram which shows processing in which the continuous data string S(t) is resolved into the sum of step waveforms. FIG. 4 shows an example in which binary data is resolved into step waveforms. Also, data that is three-valued or more can be resolved in the same way.

The equalizing processing described in Step 1 is performed for each term of the right side of Expression (4), thereby obtaining each equalizing waveform $DA_n(t)$ for the continuous data sting. Specifically, the term $S_{STEP}(t)$ of Expression (B) is replaced by $SA_n(t)$, and time shift calculation is performed, in which the term t is replaced by $(t-t_n)$, thereby obtaining each equalizing waveform $DA_n(t)$ as represented by the following Expression (D).

$$DA_n(t)=SA_n(t)\cdot[1+\Sigma_{j=1:M}f_j(t-t_n)] \tag{D}$$

In a case in which the function $f_j$ is approximated by the Expression (C), the following Expression (5) is obtained by applying the Expression (4a) and Expression (C) to the Expression (D).

$$DA_n(t) = \qquad (5)$$
$$SA_n(t) + (A[n] - A[n-1]) \cdot U(t - t_n) \cdot \sum_{j=1}^{M}\left\{\alpha_j \cdot \exp\left(\frac{-(t-t_n)}{\tau_j}\right)\right\}$$

Figure 5:
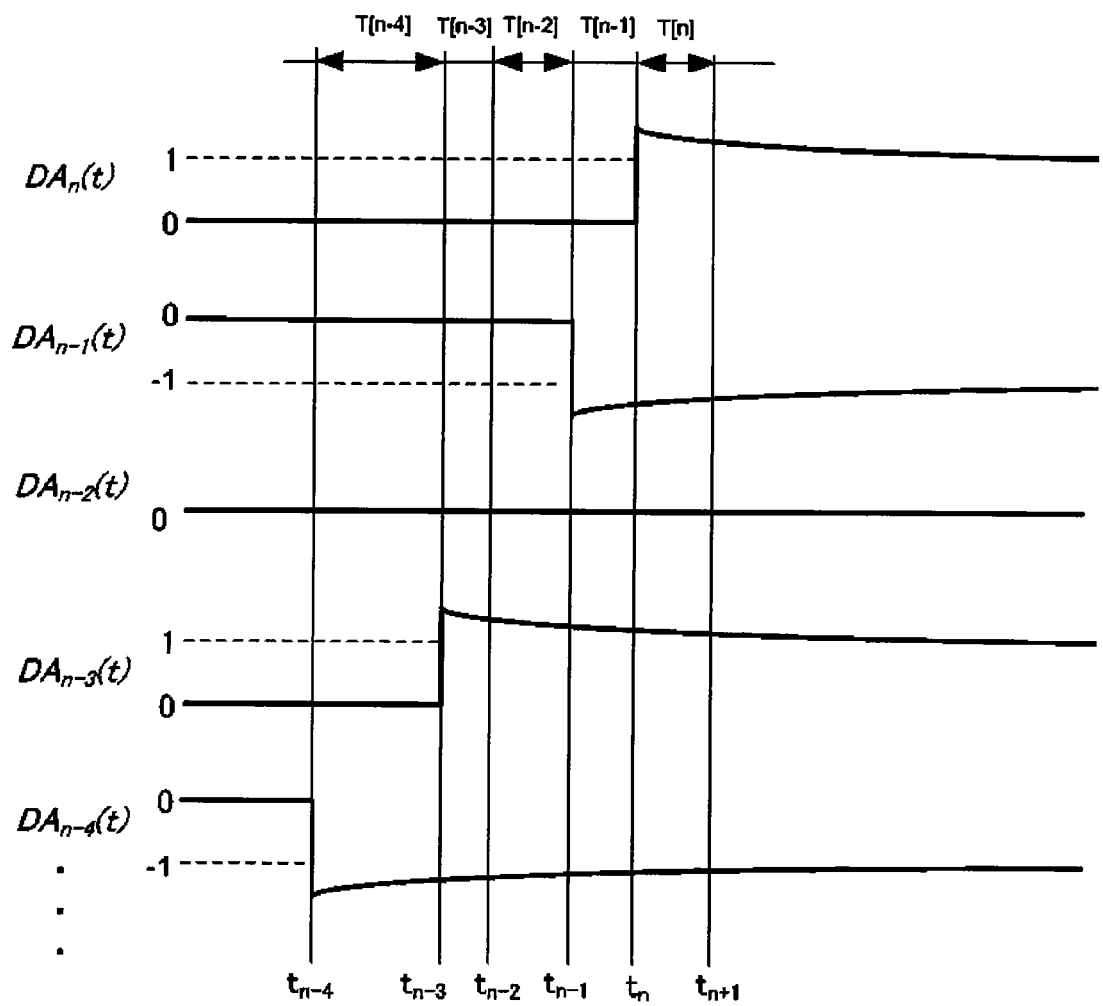
FIG. 5 is a waveform diagram which shows equalizing waveforms of the step waveform thus resolved.

FIG. 5 is a waveform diagram which shows an equalizing waveform for each of the step waveforms thus resolved.

The equalizing waveforms $DA_n(t)$ thus resolved are added together, thereby obtaining an equalizing waveform $D_{CT}(t)$ for the original wave $S(t)$ in a range of $t_N < t < t_{N+1}$.

$$D_{CT}(t) = \sum_{n=0}^{N}[DA_n(t)] \qquad (6)$$

Note that $t_N < t < t_{N+1}$.

Figure 6:
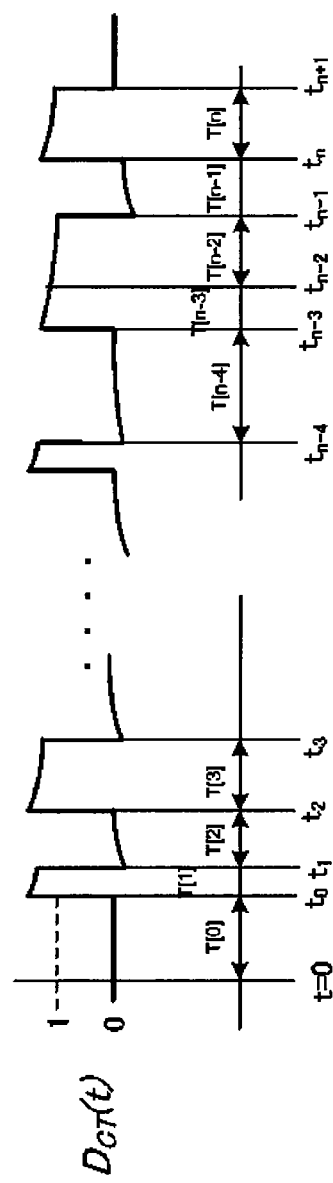
FIG. 6 is a diagram which shows a waveform obtained by superimposing the waveforms shown in FIG. 5.

FIG. 6 is a diagram which shows a waveform obtained by superimposing the waveforms shown in FIG. 5. Expression (5) is substituted into Expression (6), and Expression (4) is applied, thereby obtaining the following Expression (7).

$$D_{CT}(t) = S(t) + \sum_{\substack{n=0 \\ t_N < t < t_{N+1}}}^{N}\left[(A[n] - A[n-1]) \cdot \right. \qquad (7)$$
$$\left. U(t-t_n) \cdot \sum_{j=1}^{M}\left\{\alpha_j \cdot \exp\left(\frac{-(t-t_n)}{\tau_j}\right)\right\}\right]$$

In Expression (7), $t_N < t < t_{N+1}$, $S(t) = A[N]$, and $U(t-t_N) = 1$ are valid, and the following Expression (8) is obtained.

$$D_{CT}(t) = A[N] + \sum_{\substack{n=0 \\ t_N < t < t_{N+1}}}^{N}\left[(A[n]-A[n-1]) \cdot \sum_{j=1}^{M}\left\{\alpha_j \cdot \exp\left(\frac{-(t-t_n)}{\tau_j}\right)\right\}\right] \qquad (8)$$

The Expression (8) is represented by the functions $f_j(t)$, thereby obtaining the following Expression (E).

$$D_{CT}(t) = A[N] + \Sigma_{n=0:N}[A[n]-A[n-1]] \cdot \Sigma_{j=1:M}f_j(t)] \qquad (E)$$

It should be noted that the following relations (9) and (10) are satisfied between the time $t_n$ and the timing data $T[N]$.

$$t_n = \sum_{k=0}^{n-1} T[k] \qquad (9)$$

$$t_N - t_n = \sum_{k=0}^{N-1} T[k] - \sum_{k=0}^{n-1} T[k] = \sum_{k=n}^{N-1} T[k]$$

$$T[N] = t_{N+1} - t_N \qquad (10)$$

Figure 7:
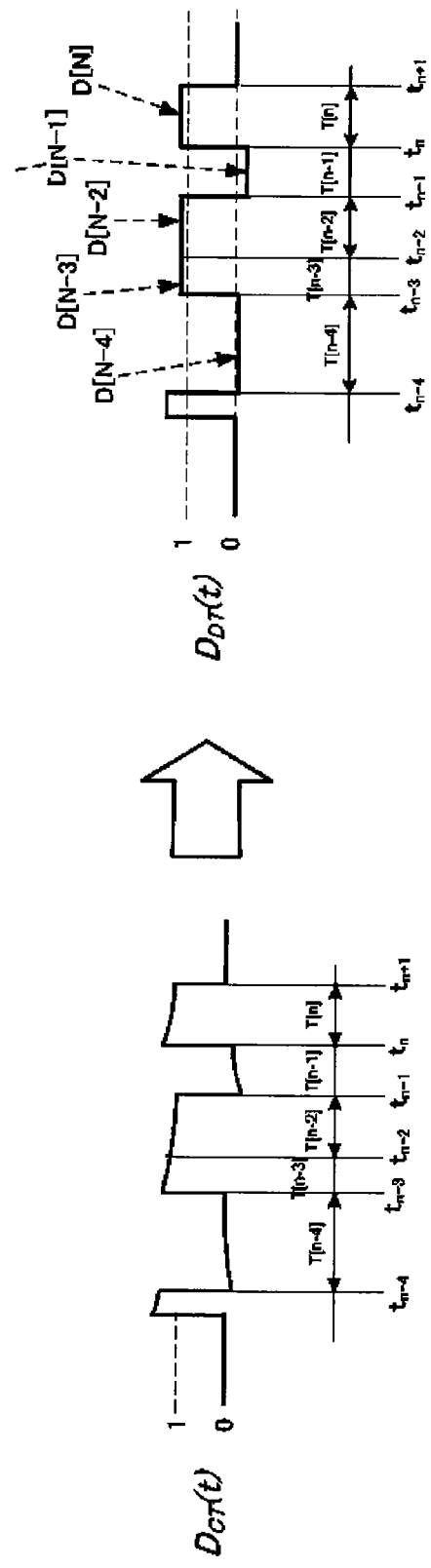
FIG. 7 is a diagram which shows an equalizing waveform in a continuous-time system and an equalizing waveform in a discrete-time system.

Description has been made in the second step regarding a continuous time system. Description will be made in the following third step regarding a discrete-time equalizer circuit. The level of the equalizing waveform $D_{CT}(t)$ for the continuous time system shown in FIG. 6 changes within each cycle. In contrast, with the discrete-time equalizer, for each cycle, the equalizing waveform has a constant level. FIG. 7 shows an equalizing waveform $D_{CT}(t)$ for a continuous time system and an equalizing waveform $D_{DT}(t_n)$ for a discrete-time system.

That is to say, with the discrete-time equalizer, the waveform $D_{CT}(t)$ is quantized in increments of cycles. In other words, the value of the waveform $D_{DT}(t_n)$ is a representative value of the waveform $D_{CT}(t)$ for the time period ranging from $t_n$ to $t_{n+1}$.

In Expression (E), let us say that the representative value of the function $f_j(t)$ in the range $t=T1$ through $T2$ can be represented by the function $g_j(T1, T2)$. In this case, in the discrete-time system, Expression (E) is rewritten as Expression (F).

$$D_{DT}[N] = A[N] + \Sigma_{n=0:N}[(A[N]-A[n-1]) \cdot \Sigma_{j=1:M}g_j(t_N-t_n, t_{N+1}-t_n)) \qquad (F)$$

The Expression (F) represents the equalizing waveform to be generated by an equalizing circuit for the discrete-time system.

As such a representative value, the integral average (area average) over the period of time of T1 through T2 may be employed. In a case in which each function $f_j(t)$ is defined by Expression (C), the function $g_j(T1, T2)$ is represented by the following Expression (11).

$$g_j(T1, T2) = \frac{\alpha_j}{T2-T1} \cdot \int_{T1}^{T2}\exp\left(\frac{-t}{\tau_j}\right)dt = \qquad (11)$$
$$\frac{-\alpha_j \cdot \tau_j}{T2-T1}\cdot\left[\exp\left(\frac{-t}{\tau_j}\right)\right]_{T1}^{T2} = \frac{\alpha_j \cdot \tau_j}{T2-T1}\cdot\left\{\exp\left(\frac{-T1}{\tau_j}\right) - \exp\left(\frac{-T2}{\tau_j}\right)\right\}$$

The Expression (11) is substituted into the Expression (F) for the discrete-time equalizer, thereby obtaining the following Expression (12).

$$D[N] = A[N] + \qquad (12)$$
$$\sum_{n=0}^{N}\left[(A[n]-A[n-1])\cdot\sum_{j=1}^{M}\left\{\alpha_j \cdot \frac{\tau_j}{t_{N+1}-t_N}\left(\exp\left\{\frac{-(t_N-t_n)}{\tau_j}\right\} - \exp\left\{\frac{-(t_{N+1}-t_n)}{\tau_j}\right\}\right)\right\}\right]$$

The Expressions (9) and (10) are substituted into the Expression (12), thereby obtaining the following Expression (13).

$$D[N] = A[N] + \sum_{n=0}^{N}\left[(A[n]-A[n-1])\cdot \qquad (13)\right.$$
$$\left.\sum_{j=1}^{M}\left(\alpha_j \cdot \frac{\tau_j}{T[N]}\left\{\exp\left(\frac{-1}{\tau_j}\cdot\sum_{k=n}^{N-1}T[k]\right) - \exp\left(\frac{-1}{\tau_j}\sum_{k=n}^{N}T[k]\right)\right\}\right)\right]$$

The above are the principles of the equalizer circuit. That is to say, the equalizer circuit 10 performs signal processing represented by Expression (F), thereby enabling a waveform having almost no distortion to be observed at the reception terminal. As shown in FIG. 1, the output data D[N] of the equalizer circuit 10 matches the data $D_{DT}[N]$ represented by Expression (F). Thus, it can be understood that the waveform distortion can be canceled out.

In a specific embodiment, the signal processing represented by the Expression (13) is executed, thereby canceling out distortion of the waveform.

[Implementation]

Next, description will be made regarding the configuration of a specific circuit for providing the signal processing represented by the Expression (13).

Expression (13) is transformed into the following Expression (14).

$$D[N] = A[N] + \sum_{n=0}^{N} \left[ (A[n] - A[n-1]) \cdot \sum_{j=1}^{M} \left( \alpha_j \cdot \frac{\tau_j}{T[N]} \exp\left(\frac{-1}{\tau_j} \cdot \sum_{k=n}^{N-1} T[k]\right) \cdot \left\{ 1 - \exp\left(\frac{-T[N]}{\tau_j}\right) \right\} \right) \right]$$

$$= A[N] + \sum_{j=1}^{M} \left[ \left( \alpha_j \cdot \frac{\tau_j}{T[N]} \cdot \left\{ 1 - \exp\left(\frac{-T[N]}{\tau_j}\right) \right\} \right) \cdot \sum_{n=0}^{N} \left\{ (A[n] - A[n-1]) \cdot \exp\left(\frac{-1}{\tau_j} \cdot \sum_{k=n}^{N-1} T[k]\right) \right\} \right]$$

Next, the substitutions in the following Expressions (15) and (16) are performed, and Expression (14) is thereby represented in the form of the following Expression (17).

$$F_T(\alpha_j, \tau_j, T[N]) = \alpha_j \cdot \frac{\tau_j}{T[N]} \cdot \left\{ 1 - \exp\left(\frac{-T[N]}{\tau_j}\right) \right\} \quad (15)$$

$$F_A(\tau_j, A[n], T[n])_{n=0}^{N} = \sum_{n=0}^{N} \left\{ (A[n] - A[n-1]) \cdot \exp\left(\frac{-1}{\tau_j} \cdot \sum_{k=n}^{N-1} T[k]\right) \right\} \quad (16)$$

$$D[N] = A[N] + \sum_{j=1}^{M} [F_T(\alpha_j, \tau_j, T[N]) \cdot F_A(\tau_j, A[n], T[n])_{n=0}^{N}] \quad (17)$$

Referring to FIG. 1, each calculation unit $ECU_j$ should calculate the term $[F_T(\alpha_j, \tau_j, T[N]) \cdot F_A(\tau_j, A[N], T[n])]$.

Figure 8:
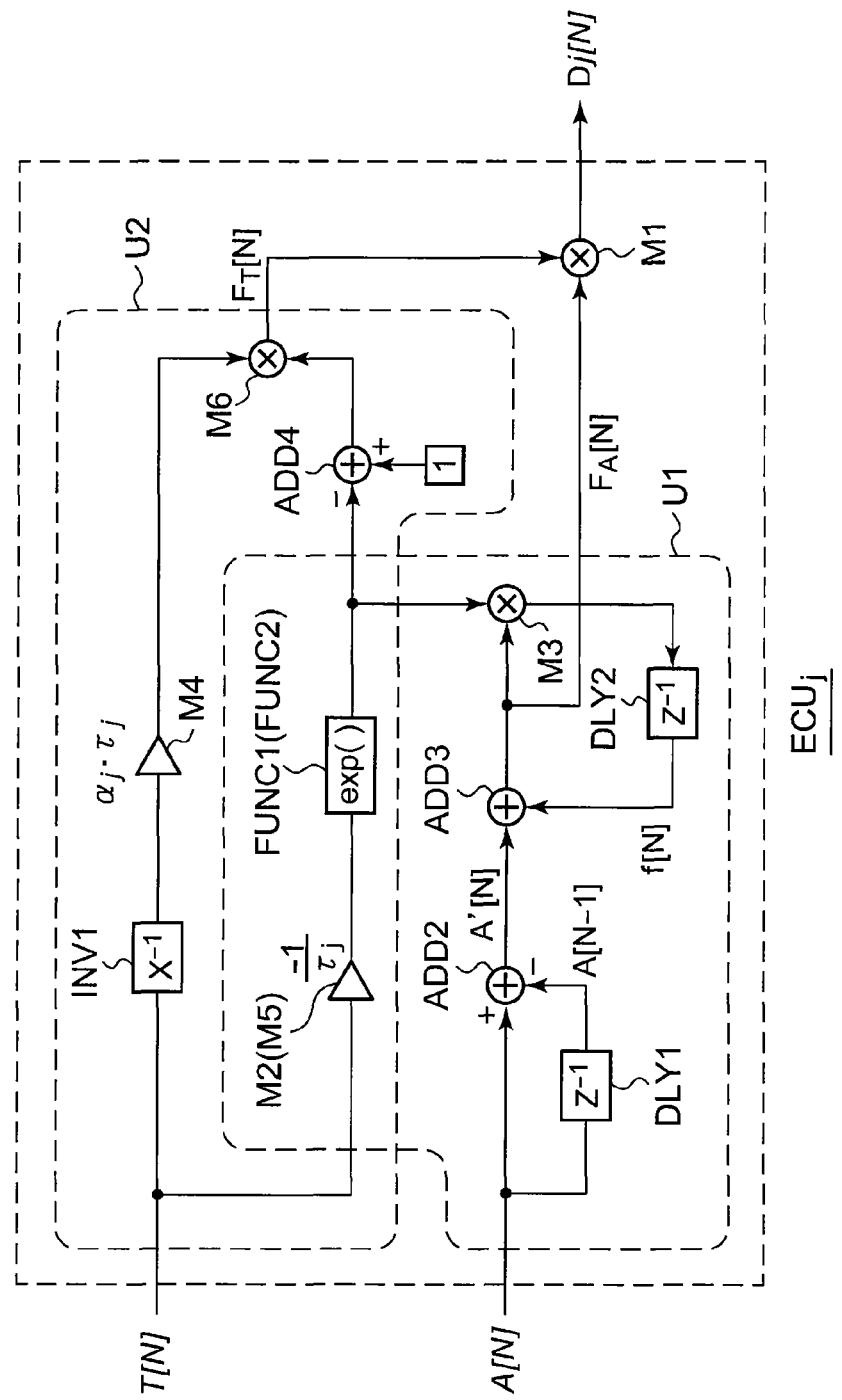
FIG. 8 is a circuit diagram which shows a first example configuration of a calculation unit.

FIG. 8 is a circuit diagram which shows a first example configuration of the calculation unit $ECU_j$. The calculation unit $ECU_j$ includes a first unit U1, a second unit U2, and a first multiplier M1.

The first unit U1 and the second unit U2 perform the calculation of $F_A[N]$ represented by Expression (16) and the calculation of $F_T[N]$ represented by Expression (15), respectively. The first multiplier M1 multiplies the output data $F_A[N]$ of the first unit U1 and the output data $F_T[N]$ of the second unit U2, and outputs the multiplication thus calculated as $D_j[N]$.

Description will be made regarding the first unit U1. Expression (16) is expanded with the term $A[n]-A[n-1]$ as $A'[n]$, and a computation method, which is the so-called Horner method, is used, thereby obtaining the following Expression (18).

$$F_A(\tau_j, A[n], T[n])_{n=0}^{N} = \sum_{n=0}^{N} \left\{ (A'[n]) \cdot \exp\left(\frac{-1}{\tau_j} \cdot \sum_{k=n}^{N-1} T[k]\right) \right\} \quad (18)$$

$$= (A'[N]) + (A'[N-1]) \cdot \exp\left\{\frac{-1}{\tau_j} \cdot T[N-1]\right\} +$$

$$(A'[N-2]) \cdot \exp\left\{\frac{-1}{\tau_j} \cdot (T[N-1] + T[N-2])\right\} +$$

$$(A'[N-3]) \cdot \exp\left\{\frac{-1}{\tau_j} \cdot (T[N-1] + T[N-2] + T[N-3])\right\} M +$$

$$(A'[1]) \cdot \exp\left\{\frac{-1}{\tau_j} \cdot (T[N-1] + T[N-2] + T[N-3] + \Lambda + T[1])\right\} +$$

$$(A'[0]) \cdot \exp\left\{\frac{-1}{\tau_j} \cdot (T[N-1] + T[N-2] + T[N-3] + \Lambda + T[0])\right\}$$

$$= A'[N] + \exp\left(\frac{-1}{\tau_j} \cdot T[N-1]\right) \cdot \left(A'[N-1] + \exp\left(\frac{-1}{\tau_j} \cdot T[N-2]\right) \cdot \right.$$

$$\left. \left(A'[N-2] + \exp\left(\frac{-1}{\tau_j} \cdot T[N-3]\right) \Lambda \left(A'[1] + \exp\left(\frac{-1}{\tau_j} \cdot T[0]\right) \cdot A'[0]\right)\right)\right)$$

The first unit U1 configured to calculate Expression (18) may be implemented as a recursive filter as shown in FIG. 8. The validity of this implementation can be understood from the following Expression (19).

$$f[N] = \exp\left(\frac{-1}{\tau_j} \cdot T[N-1]\right) \cdot (A'[N-1] + f[N-1]) \quad (19)$$

$$f[N-1] = \exp\left(\frac{-1}{\tau_j} \cdot T[N-2]\right) \cdot (A'[N-2] + f[N-2])$$

$$f[N] = \exp\left(\frac{-1}{\tau_j} \cdot T[N-1]\right) \cdot$$

$$\left(A'[N-1] + \exp\left(\frac{-1}{\tau_j} \cdot T[N-2]\right) \cdot (A'[N-2] + f[N-2])\right)$$

-continued $$f[N] = \exp\left(\frac{-1}{\tau_j} \cdot T[N-1]\right) \cdot \left(A'[N-1] + \exp\left(\frac{-1}{\tau_j} \cdot T[N-2]\right) \cdot \right.$$
$$\left. \left(A'[N-2] + \exp\left(\frac{-1}{\tau_j} \cdot T[N-3]\right) \cdot (A'[N-3] + \dots )\right)\right)$$

$$F_A[N] = A'[N] + f[N]$$

$$F_A[N] =$$
$$A'[N] + \exp\left(\frac{-1}{\tau_j} \cdot T[N-1]\right) \cdot \left(A'[N-1] + \exp\left(\frac{-1}{\tau_j} \cdot T[N-2]\right) \cdot \right.$$
$$\left. \left(A'[N-2] + \exp\left(\frac{-1}{\tau_j} \cdot T[N-3]\right) \cdot (A'[N-3] + \dots )\right)\right)$$

Specifically, the first unit U1 includes a second multiplier M2, a third multiplier M3, a first function unit FUNC1, a second adder ADD2, a third adder ADD3, a first delay circuit DLY1, and a second delay circuit DLY2.

The second multiplier M2 multiplies T[N] by $(-1/\tau_j)$, which is a constant. The first function unit FUNC1 receives the output data $(-T[N]/\tau_j)$ of the second multiplier M2, and outputs the data represented by the expression $\exp(-T[N]/\tau_j)$.

The first delay circuit DLY1 delays the data A[N] by one cycle that corresponds to the time sequence N, thereby generating A[N−1]. The second adder ADD2 subtracts A[N−1] from A[N].

The third multiplier M3 multiplies the first data $F_A[N]$ by the output data of the first function unit FUNC1, which is represented by Expression $\exp(-T[N]/\tau_j)$.

The second delay circuit DLY2 delays the output data of the third multiplier M3 by one cycle that corresponds to the time sequence N. The third adder ADD3 adds the output data of the second delay circuit DLY2 and the output data of the second adder ADD2 together so as to generate the first data $F_A[N]$.

The second unit U2 includes an inverse generator INV1, a fourth multiplier M4 through a sixth multiplier M6, a second function unit FUNC2, and a fourth adder ADD4.

The inverse generator INV1 generates the inverse of the data T[N], i.e., (1/T[N]). The fourth multiplier M4 multiplies the output data (1/T[N]) of the inverse generator INV1 by the constant $(\alpha_j \cdot \tau_j)$.

The fifth multiplier M5 multiples T[N] by $(-1/\tau_j)$, which is a constant. The second function unit C2 receives the output data of the fifth multiplier M5, which is represented by Expression $(-T[N]/\tau_j)$, and outputs the data represented by Expression $\exp(-T[N]/\tau_j)$.

The fourth adder ADD4 subtracts the output data of the second function unit FUNC2 from 1, which is a constant value. The sixth multiplier M6 multiples the output data of the fourth multiplier M4 by the output data of the fourth adder ADD4 so as to generate the second data $F_T[N]$.

At least one of the aforementioned multipliers may be provided in the form of a bit shifter. Each of the inverse generator INV1, the first function unit FUNC1, and the second function unit FUNC2 may be provided in the form of a computing unit, or may be provided in the form of a lookup table.

It should be noted that a combination of the second multiplier M2 and the first function unit FUNC1 of the first unit U1 and a combination of the fifth multiplier M5 and the second function unit FUNC2 of the second unit U2 each calculate the same term. Accordingly, the aforementioned component combinations preferably share the same circuit as shown in FIG. 8. This reduces the circuit area and computation costs.

Figure 9:
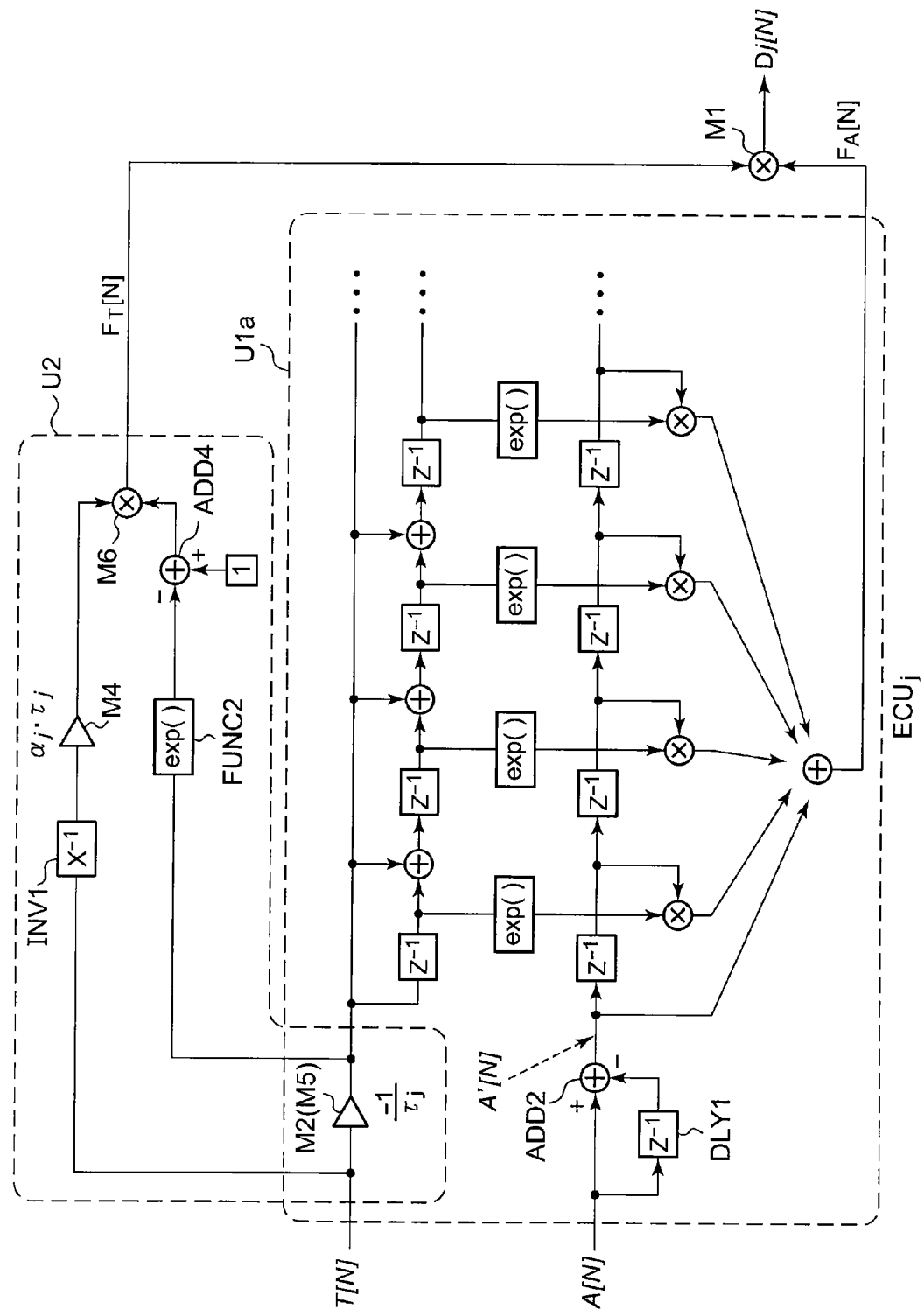
FIG. 9 is a circuit diagram which shows a second example configuration of the calculation unit.

FIG. 9 is a circuit diagram which shows a second example configuration of the calculation unit $ECU_j$. Expression (16) can be expanded as follows.

$$F_A[N] = A'[N] + A'[N-1] \cdot \exp(-1/\tau_j \cdot T[N-1]) + \quad (16a)$$
$$A'[N-2] \cdot \exp(-1/\tau_j \cdot (T[N-1] + T[N-2])) +$$
$$A'[N-3] \cdot \exp(-1/\tau_j \cdot (T[N-1] + T[N-2] + T[N-3])) + \dots$$

A first unit U1a shown in FIG. 9 is configured in the form of an L-order FIR filter which adds the terms of Expression (16a) until the L-th (L is an integer) term.

Description has been made regarding the embodiments according to the present invention. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Description has been made in the aforementioned embodiment regarding an arrangement in which the integral average is employed as the representative value $g_j$ of the function $f_j(t)$. Also, an arrangement may be made in which the value at the median of the time points T1 and T2 is employed as the representative value $g_j$ of the function $f_j(t)$. That is to say, the representative value $g_j$ may be represented by the Expression $g_j(T1, T2) = f_j((T1+T2)/2)$.

In this case, the following Expression (20) is satisfied.

$$g_j(T_1, T_2) \approx \alpha_j \cdot \exp\left(\frac{-(T_1 + T_2)}{2\tau_j}\right) \quad (20)$$

The Expression (20) is applied to the Expression (F), thereby obtaining the following Expressions (21a) through (21c).

$$D[N] = A[N] + \quad (21a)$$
$$\sum_{n=0}^{N}\left[(A[n] - A[n-1]) \cdot \sum_{j=1}^{M}\left\{\alpha_j \cdot \exp\left(\frac{-(t_N - t_n + t_{N+1} - t_n)}{2\tau_j}\right)\right\}\right]$$

$$D[N] = A[N] + \sum_{n=0}^{N}\left[(A[n] - A[n-1]) \cdot \right. \quad (21b)$$
$$\left. \sum_{j=1}^{M}\left\{\alpha_j \cdot \exp\left(\frac{-1}{2\tau_j}\left(\sum_{k=n}^{N-1} T[k] + \sum_{k=n}^{N} T[k]\right)\right)\right\}\right]$$

$$D[N] = A[N] + \sum_{j=1}^{M}\left[\alpha_j \cdot \exp\left(\frac{-1}{2\tau_j}T[N]\right) \cdot \right. \quad (21c)$$
$$\left. \sum_{n=0}^{N}\left\{(A[n] - A[n-1]) \cdot \exp\left(\frac{-1}{\tau_j}\sum_{k=n}^{N-1} T[k]\right)\right\}\right]$$

Figure 10:
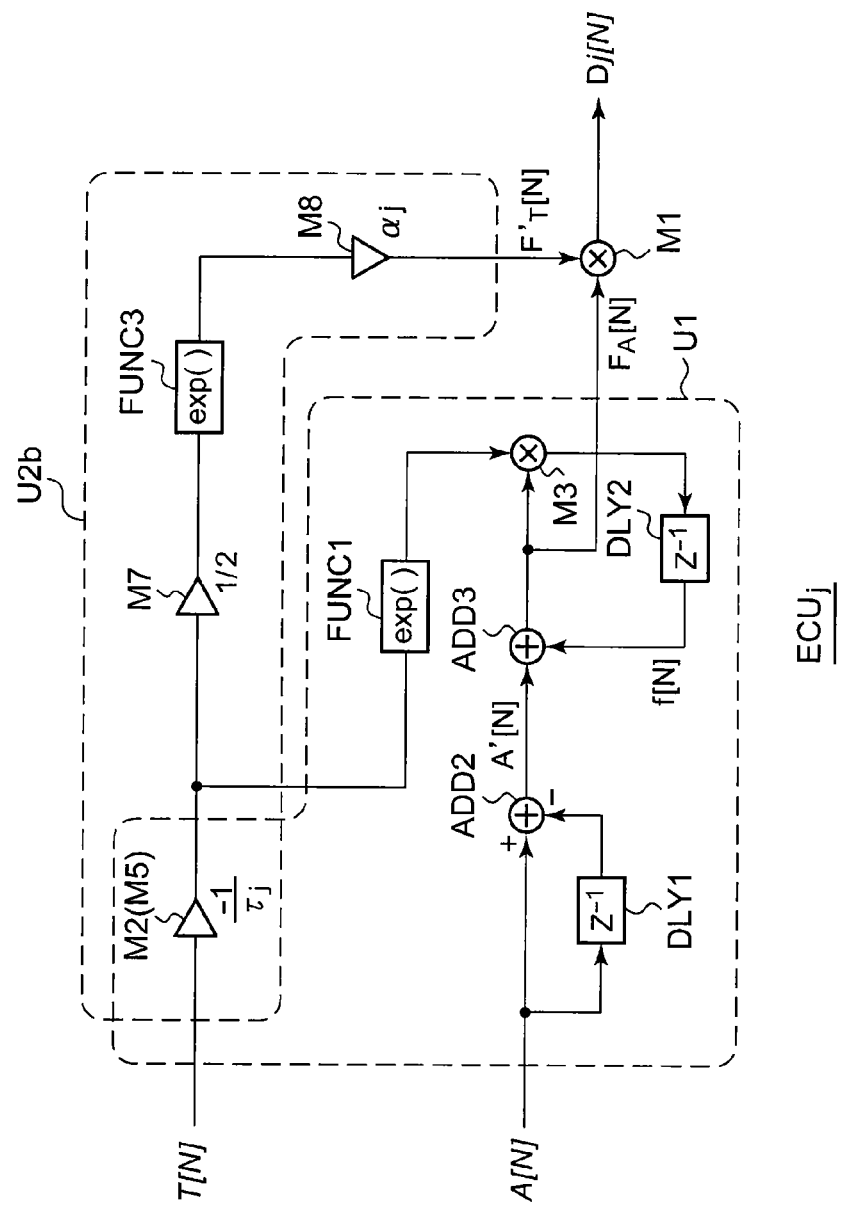
FIG. 10 is a circuit diagram which shows the configuration of a calculation unit according to a first modification.

FIG. 10 is a circuit diagram which shows a configuration of the calculation unit $ECU_j$ according to a first modification. A second unit U2b calculates the third data $F_T'[N]$ represented by $\alpha_j\cdot\exp(-T[N]/(2\cdot\tau_j))$ which is a term of the Expression (21c). Specifically, the second unit U2b includes a fifth multiplier M5, a seventh multiplier M7, a third function unit FUNC3, and an eighth multiplier M8, which are connected in series. The fifth multiplier M5 multiplies T[N] by $(-1/\tau_j)$, which is a constant value. The second multiplier M7 multiplies the output data of the fifth multiplier M5 by (½), which is a constant value. The third function unit FUNC3 receives the output data x of the seventh multiplier M7, and outputs data represented by Expression exp(x). The eighth multiplier M8 multiplies the output data of the third function unit FUNC3 by $\alpha_j$, which is a constant value.

The first unit U1 has the same configuration as that shown in FIG. 8. The first multiplier M1 multiplies the first data $F_A[N]$ by the third data $F_T'[N]$.

In contrast to the function unit $ECU_j$ shown in FIG. 8 or FIG. 9, such a modification requires no inverse generator, thereby reducing the circuit scale.

[Second Embodiment]

Figure 11:
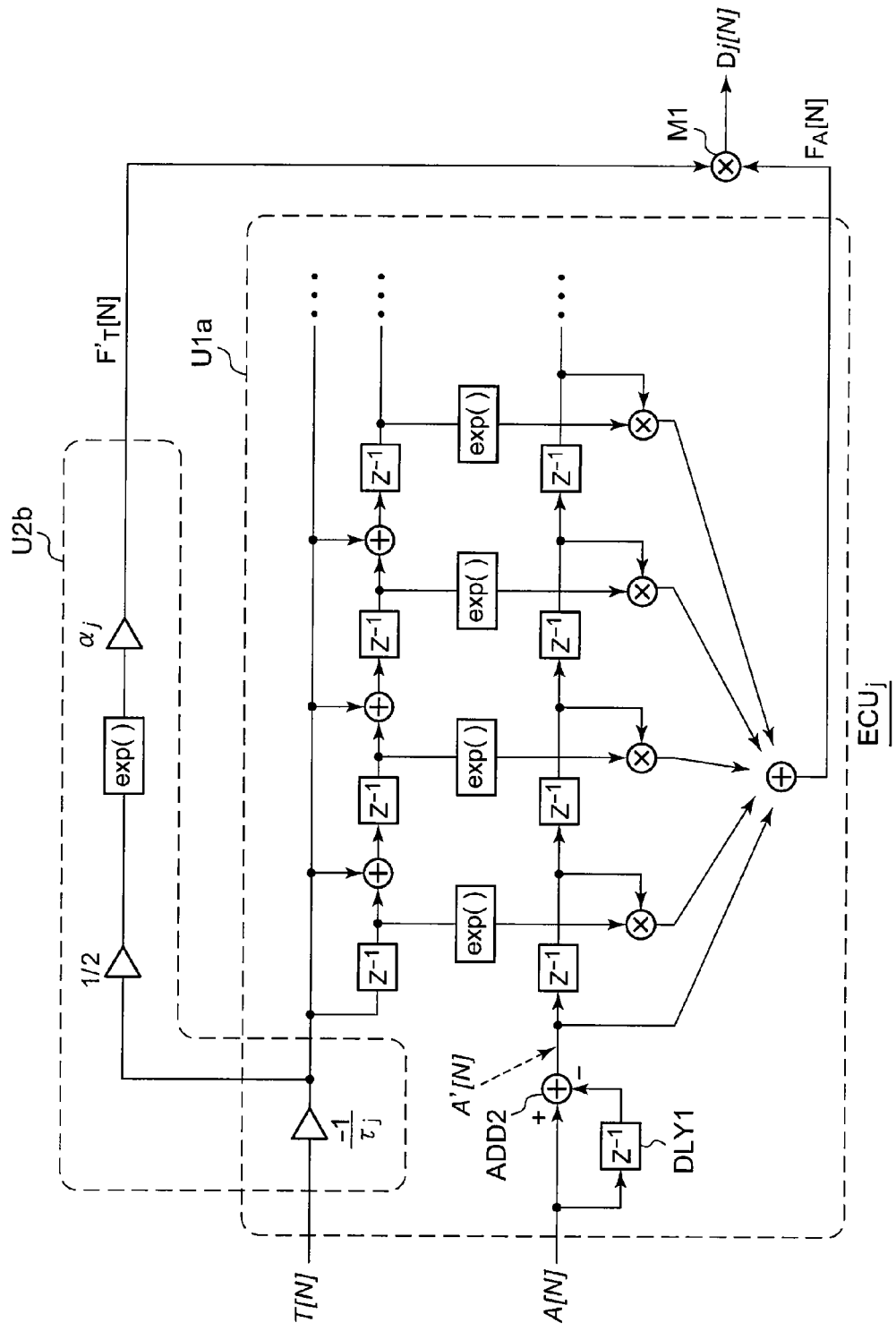
FIG. 11 is a circuit diagram which shows the configuration of a calculation unit according to a second modification.

FIG. 11 is a circuit diagram which shows a configuration of a calculation unit $ECU_j$ according to a second modification. The circuit shown in FIG. 11 is a combination of the first unit U1a shown in FIG. 9 and the second unit U2b shown in FIG. 10. Such a modification is effectively made as the present invention.

[Third Modification]

Figure 12:
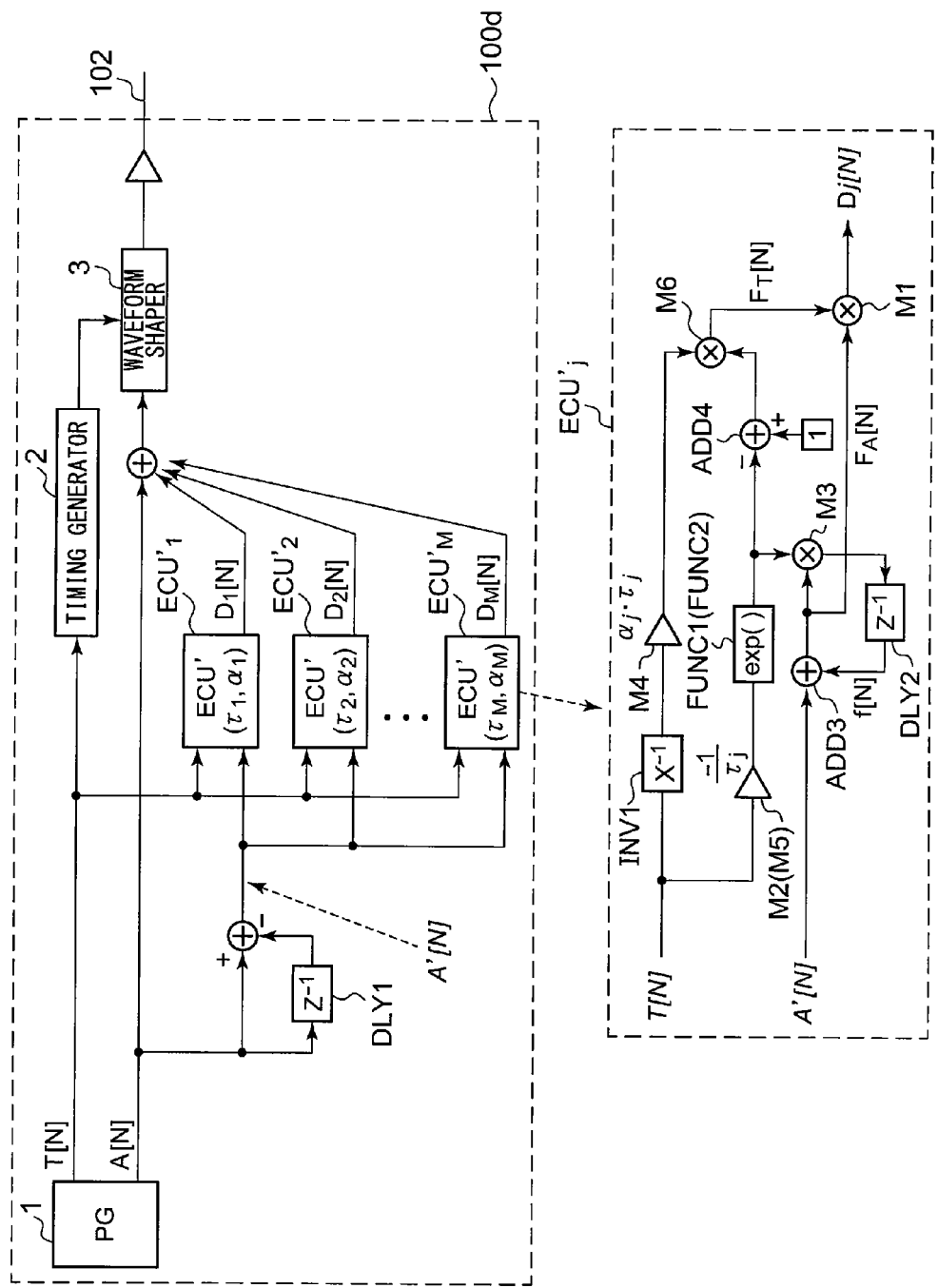
FIG. 12 is a circuit diagram which shows the configuration of a calculation unit according to a third modification.

FIG. 12 is a circuit diagram which shows a configuration of a calculation unit $ECU'_j$ according to a third modification. In FIG. 12, a combination of the first delay circuit DLY1 and the second adder ADD2 shown in FIG. 8 is shared by the multiple calculation units $ECU_1$ through $ECU_M$. Such a modification reduces the overall area of the interface circuit 100d, as compared with that shown in FIG. 8.

[Fourth Modification]

Figure 13:
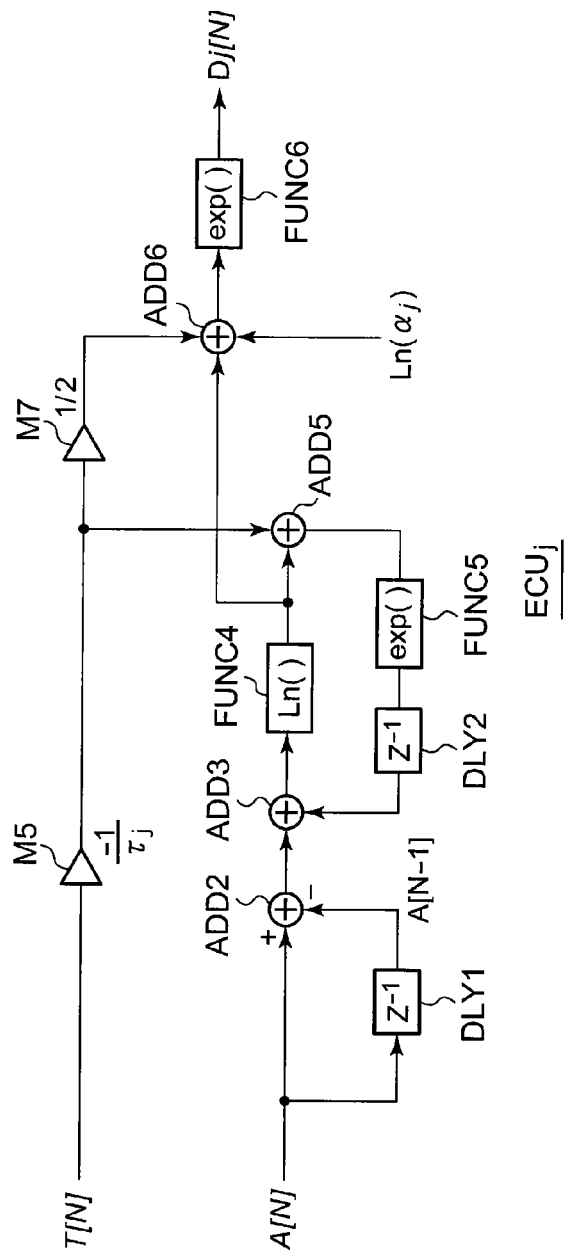
FIG. 13 is a circuit diagram which shows the configuration of a calculation unit according to a fourth modification.

FIG. 13 is a circuit diagram which shows a calculation unit $ECU_j$ according to a fourth modification. Such an arrangement shown in FIG. 13 has a configuration obtained by replacing a part of the circuit shown in FIG. 10 by a LOG conversion circuit. That is to say, the relation represented by the Expression $A\times B=\exp(\log_e A+\log_e B)$ is applied to the Expression (21c), i.e., $F_T'[N]=\alpha_j\cdot\exp(-T[N]/(2\cdot\tau_j))$, thereby obtaining the following Expression (22).

$$\log_e\left\{\alpha_j\cdot\exp\left(\frac{-T[N]}{2\tau_j}\right)\right\}= \qquad (22)$$

$$\log_e\alpha_j+\log_e\left\{\exp\left(\frac{-T[N]}{2\tau_j}\right)\right\}=\log_e\alpha_j-\frac{T[N]}{2\tau_j}$$

The calculation unit $ECU_j$ shown in FIG. 13 performs calculation according to the Expression (22). Specifically, the calculation unit $ECU_j$ includes adders ADD2, ADD3, ADD5, and ADD6, delay circuits DLY1 and DLY2, function units FUNC4 through FUNC6, and multipliers M5 and M7.

The fifth multiplier M5 multiplies T[N] by the coefficient $(-1/\tau_j)$. The seventh multiplier M7 multiplies the output data of the fifth multiplier M5 by (½). The fourth function unit FUNC4 takes the logarithm of the input data x, i.e., $\log_e(x)$. The sixth adder ADD6 adds the output data of the seventh multiplier M7, the output data of the fourth function unit FUNC4, and $\log_e(\alpha_j)$, which is a constant value. The sixth function unit FUNC6 receives the output data x of the sixth adder ADD6, and outputs data exp(x).

The fifth adder ADD5 adds the output data of the fifth multiplier M5 and the output data of the fourth function unit FUNC4 together. The fifth function unit FUNC5 receives the output data x of the fifth adder ADD5, and outputs the data represented by Expression exp(x). The second delay circuit DLY2 delays the output data of the fifth function unit FUNC5 by one cycle that corresponds to the time sequence N. The third adder ADD3 adds the output data of the second delay circuit DLY2 and the output data of the second adder ADD2 together, and outputs the data thus calculated to the fourth function unit FUNC4.

Such a modification shown in FIG. 13 reduces the number of necessary multipliers as compares with the configuration shown in FIG. 10.

[Fifth Modification]

As the representative value $g_j$ of the function $f_j(t)$, the average of the values of the function $f_j(t)$ at the time points T1 and T2 may be employed.

$$g_j(T1,T2)=\{f_j(T1)+f_j(T2)\}/2$$

Specific circuit can be configured by those skilled in this art based upon the aforementioned Expression.

[Sixth and Seventh Modifications]

FIGS. 14A and 14B are block diagrams which show the configurations of equalizer circuits 10e and 10f according to a sixth modification and a seventh modification, respectively.

[Eighth Modification]

Description has been made in the above embodiment regarding arrangements in which a digital signal is processed. Also, a part or all of the processing may be performed by analog computation.

In the sixth modification, the equalizer circuit 10e includes memory 11 instead of the multiple calculation units ECU. In this modification, each equalizing amount $\Sigma_{j=1:M} D_j[N]$ that corresponds to the corresponding data A[N] and T[N] is calculated beforehand using a method equivalent to the calculation units $ECU_1$ through $ECU_M$ shown in FIG. 1, and the equalizing amounts thus calculated are stored in the memory 11. The first adder ADD1 adds A[N] and the corresponding equalizing amount stored in the memory 11.

In the seventh modification, the equalizer circuit 10f is provided in the form of memory. That is to say, the equalizing waveform represented by the Expression (F) is calculated beforehand, and the equalizing waveform thus calculated is stored in the memory.

It is difficult to apply the sixth modification or the seventh modification to data transmission in which the data to be transmitted is unforeseeable. However, such modifications can be suitably applied to applications such as semiconductor test apparatuses in which predetermined pattern data is supplied to a DUT.

Description has been made regarding the present invention with reference to the embodiments. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. An equalizer circuit configured to receive amplitude data A[N] which represents the amplitude level of an N-th (N is a nonnegative integer) signal to be transmitted via a transmission line and timing data T[N] which represents the cycle of the signal, and to perform waveform shaping, comprising:

M (M is an integer) calculation units; and a first adder configured to add output data of the M calculation units and the amplitude data A[N] so as to generate equalized amplitude data, wherein a step response waveform $R_{STEP}(t)$ for the transmission line is approximated by Expression $R_{STEP}(t)=S_{STEP(t)} \cdot (1-\Sigma_{j=1:M} f_j(t))$ using M functions $f_j(t)$ ($1 \leq j \leq M$) and a step waveform $S_{STEP}(t)$ with time t as an argument, and wherein a representative value of the function $f_j(t)$ in a range between T1 and T2 is represented by a function $g_j(T1, T2)$, and wherein the j-th ($1 \leq j \leq M$) calculation unit calculates output data $D_j[N]$ represented by Expression $D_j[N]=\Sigma_{n=0:N}[(A[n]-A[n-1]) \cdot g_j(t_N-t_n, t_{N+1}-t_n)]$.

2. An equalizer circuit according to claim 1, wherein the functions $f_j(t)$ that correspond to respective different integers j are each defined in the same form, and wherein the M calculation units have the same configuration.

3. An equalizer circuit according to claim 2, wherein the function $f_j(t)$ is defined by Expression $f_j(t)=a_j \cdot \exp(-t/\tau_j)$ using parameters $a_j$ and $\Sigma_j$.

4. An equalizer circuit according to claim 3, wherein the j-th ($1 \leq j \leq M$) calculation unit comprises:

a first unit configured to calculate first data represented by Expression $\Sigma_{n=0:N}[(A[n]-A[n-1]) \cdot \exp(-1/\tau_j \cdot \Sigma_{k=n:N-1} T[k])]$;

a second unit configured to calculate second data represented by Expression $a_j \cdot \tau_j/T[N] \cdot \{1-\exp(-T[N]/\tau_j)\}$; and a first multiplier configured to multiply the first data by the second data.

5. An equalizer circuit according to claim 4, wherein the first unit comprises:

a second multiplier configured to multiply $T[N]$ by $(-1/\tau_j)$, which is a constant value;

a first function unit configured to receive the output data of the second multiplier, which is represented by Expression $(-T[N]/\tau_j)$, and to output data represented by Expression $\exp(-T[N]/\tau_j)$;

a first delay circuit configured to delay A[N] by one cycle that corresponds to the time sequence N, and to generates A[N−1];

a second adder configured to subtract the data A[N−1] from the data A[N];

a third multiplier configured to multiply the first data by the output data of the first function unit;

a second delay circuit configured to delay the output data of the third multiplier by one cycle that corresponds to the time sequence N; and a third adder configured to add the output data of the second delay circuit and the output data of the second adder together so as to generate the first data.

6. An equalizer circuit according to claim 4, wherein the second unit comprises:

an inverse generator configured to generate the inverse of T[N], i.e., (1/T[N]);

a fourth multiplier configured to multiply the output data of the inverse generator, which is represented by (1/T[N]), by $(a_j \cdot \tau_j)$, which is a constant value;

a fifth multiplier configured to multiply T[N] by $(-1/\tau_j)$, which is a constant value;

a second function unit configured to receive the output data of the fifth multiplier, i.e., $(-T[N]/\tau_j)$, and to output data represented by $\exp(-T[N]/\tau_j)$;

a fourth adder configured to output data obtained by subtracting the output data of the second function unit from 1, which is a constant value; and a sixth multiplier configured to multiply the output data of the fourth multiplier by the output data of the fourth adder so as to generate the second data.

7. An equalizer circuit according to claim 4, wherein the first unit is configured in the form of an L-order FIR filter configured to add the following terms up to an L-th term (L is an integer): $(A[N]-A[N-1])+(A[N-1]-A[N-2]) \cdot \exp(-1/\tau_j \cdot T[N-1])+(A[N-2]-A[N-3]) \cdot \exp(-1/\tau_j \cdot (T[N-1]+T[N-2]))+(A[N-3]-A[N-4]) \cdot \exp(-1/\tau_j \cdot (T[N-1]+T[N-2]+T[N-3]))+\ldots$.

8. An equalizer circuit according to claim 3, wherein the j-th ($1 \leq j \leq M$) calculation unit comprises:

a first unit configured to calculate first data represented by Expression $\Sigma_{n=0:N}[(A[n]-A[n-1]) \cdot \exp(-1/\tau_j \cdot \Sigma_{k=n:N-1} T[k])]$;

a second unit configured to calculate third data represented by Expression $a_j \cdot \exp(-T[N]/(2 \cdot \tau_j))$; and a first multiplier configured to multiply the first data by the third data.

9. An equalizer circuit according to claim 8, wherein the first unit is configured in the form of an L-order FIR filter configured to add the following terms up to an L-th term (L is an integer): $(A[N]-A[N-1])+(A[N-1]-A[N-2]) \cdot \exp(-1/\tau_j \cdot T[N-1])+(A[N-2]-A[N-3]) \cdot \exp(-1/\tau_j \cdot (T[N-1]+T[N-2]))+(A[N-3]-A[N-4]) \cdot \exp(-1/\tau_j (T[N-1]+T[N-2]+T[N-3]))+\ldots$.

10. A transmitter comprising:

a pattern generator configured to generate amplitude data A[N] and timing data T[N];

an equalizer circuit according to claim 1;

a waveform shaping unit configured to perform retiming of the amplitude data D[N] equalized by the equalizer circuit, according to the timing data T[N]; and a driver configured to convert the output data of the waveform shaping unit into a multi-valued signal.

11. A test apparatus configured to supply test data to a device under test, the test apparatus comprising:

a pattern generator configured to generate amplitude data A[N] and timing data T[N];

a timing generator configured to receive the timing data T[N], and to generate an edge according to a timing that corresponds to the value of the timing data T[N];

an equalizer circuit according to claim 1;

a waveform shaping unit configured to perform retiming of the amplitude data D[N] equalized by the equalizer circuit, according to the edge generated by the timing generator; and a driver configured to convert the output data of the waveform shaping unit into a multi-valued signal.

12. A method for performing waveform shaping of a signal to be transmitted via a transmission line, in which a step response waveform $R_{STEP}(t)$ for the transmission line is approximated by Expression $R_{STEP}(t)=S_{STEP}(t) \cdot (1-\Sigma_{j=1:M} f_j(t))$ using M (M is an integer) functions $f_j(t)$ ($1 \leq j \leq M$) and a step waveform $S_{STEP}(t)$ with time t as an argument, and a representative value of the function $f_j(t)$ in a range between T1 and T2 is represented by a function $g_j(T1, T2)$, the method comprising:

generating, sequentially in increments of N, amplitude data A[N] which represents the amplitude level of the N-th signal (N is a nonnegative integer) and the timing data T[N] which represents the cycle of the signal; and outputting equalized amplitude $D_{DT}[N]$ which is represented by Expression $D_{DT}[N]=A[N]+\Sigma_{n=0:N}[(A[n]-A[n-1]) \cdot \Sigma_{j=1:M} g_j(t_N-t_n, t_{N+1}-t_n))$.

13. A method according to claim 12, wherein the functions $f_1(t), f_2(t), \ldots, f_M(t)$ are each defined in the same form.

14. A method according to claim 13, wherein the functions $f_j(t)$ are each defined by Expression $f_j(t)=a_j \cdot \exp(-t/\tau_j)$ using parameters $a_j$ and $\tau_j$.

15. A method according to claim 12, wherein the integral average of the function $f_j(t)$ over the period from the time point T1 up to the time point T2 is employed as the function $g_j(T1, T2)$.

16. A method according to claim 12, wherein the function $g_j(T1, T2)$ is represented by Expression $g_j(T1, T2)=\{f_j(T1)+f_j(T2)\}/2$.

17. A method according to claim 12, wherein the function $g_j(T1, T2)$ is represented by Expression $g_j(T1, T2)=f_j((T1+T2)/2)$.

* * * * *